United States Patent
Bass et al.

(10) Patent No.: US 6,790,620 B2
(45) Date of Patent: Sep. 14, 2004

(54) SMALL VOLUME CHAMBERS

(75) Inventors: Jay K. Bass, Mountain View, CA (US); John F. McEntee, Boulder Creek, CA (US); Tim J. Lazaruk, Redwood City, CA (US); Maryam Mobed-Miremadi, Sunnyvale, CA (US); Brent T. Tolosko, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/035,787

(22) Filed: Dec. 24, 2001

(65) Prior Publication Data

US 2003/0118716 A1 Jun. 26, 2003

(51) Int. Cl.[7] .......................... C12Q 1/68; C07H 21/00; C12M 1/36; G01N 15/06
(52) U.S. Cl. ............................ 435/6; 435/7.1; 435/174; 435/283.1; 435/288.5; 422/50; 422/129; 422/134; 536/23.1; 536/25.3

(58) Field of Search .................. 435/4, 6, 7.1, 174, 435/283.1, 288.5; 422/50, 129, 134; 536/25.3, 23.1

(56) References Cited

U.S. PATENT DOCUMENTS 6,517,079 B1 * 2/2003 Sommereisen .............. 277/431

* cited by examiner

Primary Examiner—BJ Forman

(57) ABSTRACT

Apparatus and methods are disclosed for forming a reaction chamber having relatively small volumes. An apparatus comprises two elements and a mechanism for introducing a gas to form a movable aerodynamic seal between the elements. In this manner a chamber having a controllable interior environment is formed. One of the elements may have at least a portion of a device for dispensing reagents sealingly affixed therein. The other element may be adapted for introduction of a support into the interior of the chamber formed by the top and the bottom element. The apparatus may be used in methods for synthesizing biopolymers on a support.

21 Claims, 4 Drawing Sheets

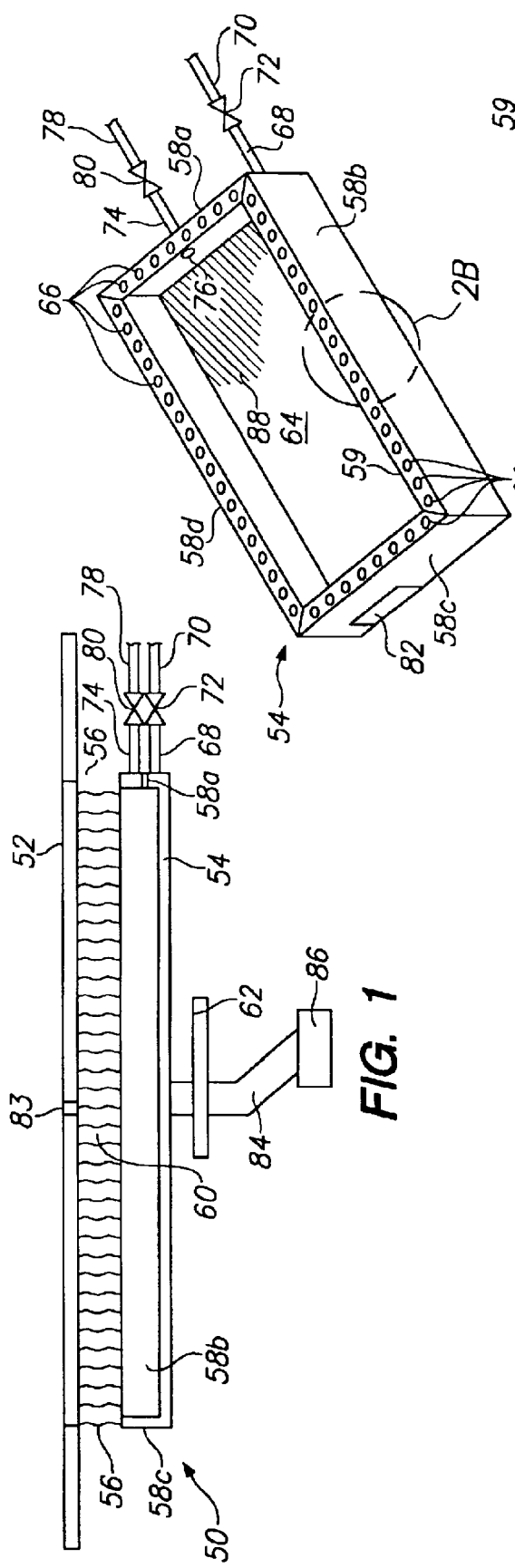
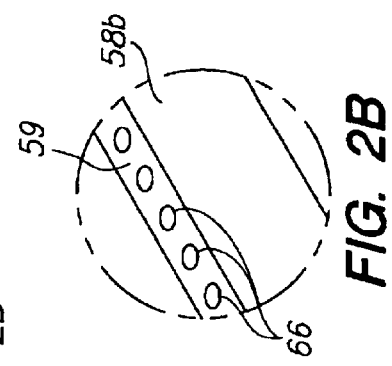
FIG. 1
FIG. 2A
FIG. 2B
FIG. 3A

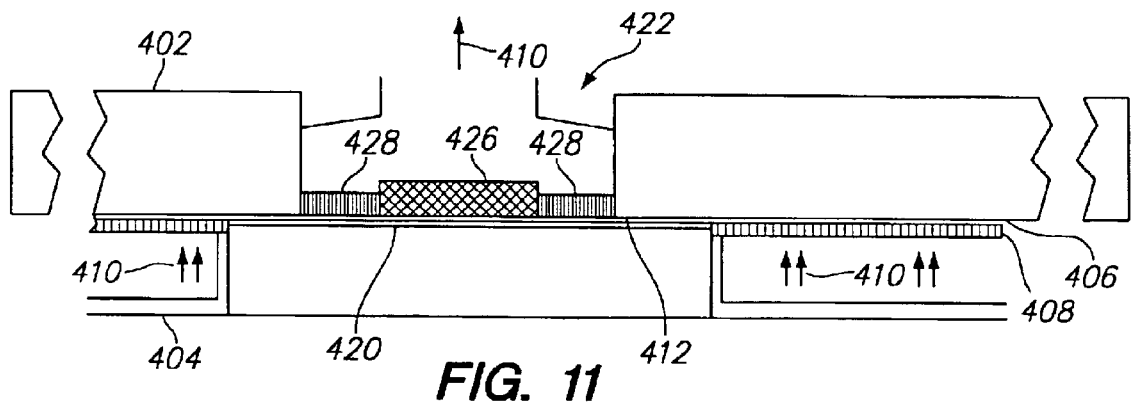
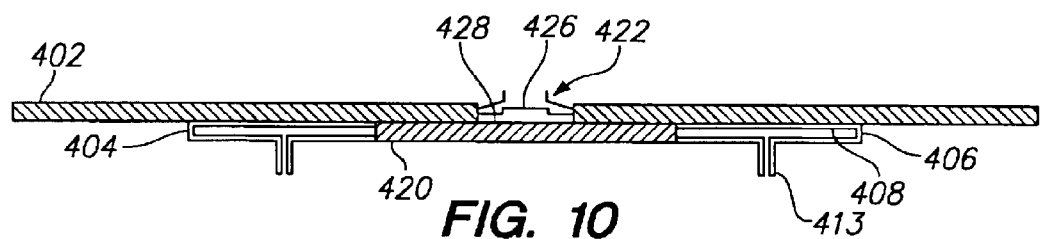
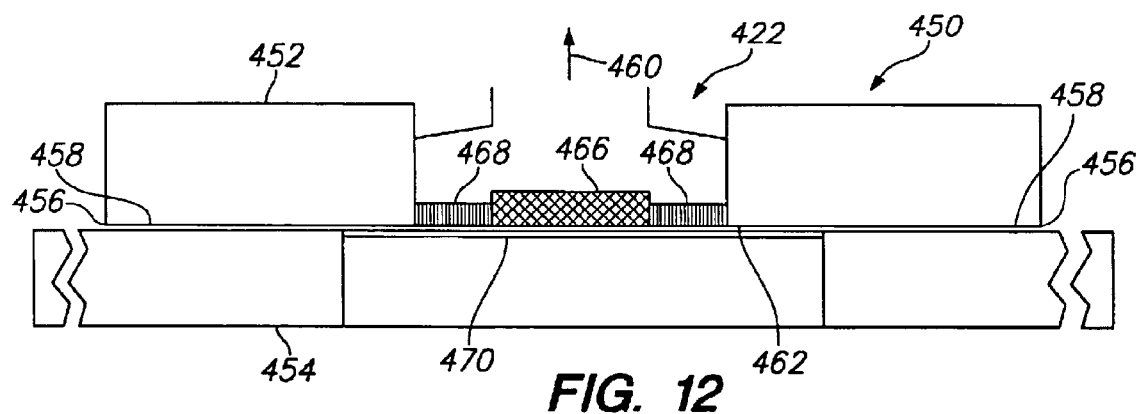

SMALL VOLUME CHAMBERS

BACKGROUND OF THE INVENTION

This invention relates to chambers for carrying out procedures such as the preparation of substrates having a plurality of reaction spots. The invention has particular application in the manufacture of supports having bound to the surfaces thereof a plurality of chemical compounds, such as biopolymers, which are prepared on the surface in a series of steps.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical compounds or moieties or probe species provide methods of highly parallel detection, and hence improved speed and efficiency, in assays. Assuming that the different sequence polynucleotides were correctly deposited in accordance with the predetermined configuration, then the observed binding pattern will be indicative of the presence and/or concentration of one or more polynucleotide components of the sample.

The arrays may be microarrays created by in-situ synthesis of biopolymers such as polynucleotides, polypeptides, polysaccharides, etc., and combinations thereof, or by deposition of molecules such as oligonucleotides, cDNA and so forth. In general, arrays are synthesized on a surface of a substrate by one of any number of synthetic techniques that are known in the art. In one approach to the synthesis of microarrays, an apparatus is employed that comprises a reaction chamber and a device for dispensing reagents to the surface of a substrate at discrete sites. A positioning system, which may be a robotic manipulator, moves the substrate to the chamber, in which the device for dispensing reagents is housed. Alternatively, the device for dispensing reagents may be moved in and out of the chamber. A controller controls the application of the reagents to the substrate according to predetermined procedures.

In situ syntheses generally require a controlled environment in the reaction chamber. For example, many syntheses require an anhydrous environment to avoid the destructive effects of exposing chemical reagents to humidity present in the ambient atmosphere. Typically, an anhydrous chamber is created by enclosing the device for dispensing reagents in a reaction chamber through which dry gas is purged. At least a portion of the dispensing apparatus as well as the substrate, to the surface of which dispensed reagents are to be applied, are enclosed in a chamber. Also included are the various stages such as x,y stages used to move the substrate relative to the dispensing apparatus and allowing the desired reagents to be applied to predetermined locations.

To produce arrays it is important to reproducibly perform reactions at a particular site without affecting adjacent sites. The reaction should approximate stoichiometry in producing the desired product. Since many of the reactions are performed stepwise, any failure during the synthesis results in the wrong product. The site for each reaction must be defined so that the reaction occurs in a rapid and efficient manner. Each step in the process should provide for a reproducible result and not interfere with the next stage or the reaction at a different site.

Since the arrays provide for a large number of different compounds, the process requires many steps. With oligonucleotides, an in situ synthesis is employed wherein each monomer addition involves a plurality of steps, so that the synthesis at each site involves the number of steps for each addition multiplied by the number of monomers in the oligonucleotide. In order to be able to produce arrays of oligonucleotides efficiently, automated systems are preferred to provide for the accurate placement of reagents, efficient reaction, close packing of different compounds and the indexing of individual oligonucleotides with a particular site in the array.

As might be imagined, relatively large chambers are required to surround the aforementioned members of the overall apparatus. Larger chambers require proportionately greater amounts of gas to control atmospheric conditions such as humidity. The flow of gas inside a large volume chamber with equipment inside is inherently difficult to control. There is the potential for stagnation zones and consequent non-uniform atmospheric conditions in side the chamber. In order to change rapidly the humidity, for example, in a large volume chamber, high flow rates of dry gas such as nitrogen are required. Furthermore, the substrate must be held at a predetermined distance from the dispensers of the dispensing apparatus in order to achieve accuracy of the dispensing process. Accordingly, configurations that have moving stages outside of the chamber and the substrate inside the chamber increase the inherent errors in the process.

There is, therefore, a need for a chamber that is relatively small in size and that allows for substantial control of the environment within the chamber. The chamber should allow devices such as dispensing elements to be incorporated in the chamber.

SUMMARY OF THE INVENTION

One embodiment of the present invention is an apparatus for preparing an array of chemical compounds on the surface of a support. The apparatus comprises two elements that are in a sealed, movable relationship relative to one another and that form a chamber having a controllable interior environment for preparing said array of chemical compounds.

Another embodiment of the present invention is an apparatus comprising a top element, a bottom element, and a mechanism for introducing a gas to form a movable aerodynamic seal between the top element and the bottom element. In this manner a chamber having a controllable interior environment is formed. The top element may have at least a portion of a device for dispensing reagents sealingly affixed therein. The bottom element may be adapted for introduction of a support into the interior of the chamber formed by the top and the bottom elements.

Another embodiment of the present invention is an apparatus for manufacturing a plurality of biopolymers on a support. A top element of the apparatus has sealingly affixed therein at least a portion of a device for dispensing reagents for synthesizing the biopolymers on a surface of the support. A bottom element of the apparatus is adapted for introduction of a support therethrough. The surface of the support comprises discrete sites that are activated for reaction with the reagents. The apparatus further comprises a mechanism for introducing a gas into a gap between the top and the bottom element to form a movable aerodynamic seal between the top element and the bottom element. In this manner a chamber is formed having a relatively small volume and a controllable interior environment. The apparatus also comprises a platform to which the support is releasably attached. The platform is adapted to move the surface of the support relative to the dispensing device and the bottom element of the apparatus relative to the top element thereof.

Another embodiment of the present invention is a method for forming a chamber having a controllable interior environment. A separate top element and a separate bottom element are disposed relative to one another to form a gap between the two elements. A gas is introduced into the gap. The pressure of the gas is sufficient to form a movable aerodynamic seal between the top element and the bottom element thereby forming the chamber. The top element may have sealingly affixed therein at least a portion of a device for dispensing reagents. The bottom element may be adapted for sealing introduction of a support therethrough.

Another embodiment of the present invention is a method for synthesizing a plurality of biopolymers on a support. A reaction chamber is formed by disposing two elements relative to one another to form a gap between the two elements. A gas is introduced into the gap to form a movable aerodynamic seal between the elements thereby forming the chamber. The support is introduced into the reaction chamber. The support and a dispensing system for dispensing reagents for the synthesis of the biopolymers are brought into a dispensing position relative to activated discrete sites on a surface of the support by moving the support and one of the elements relative to the other element. Reagents are dispensed to the discrete sites and the support and/or the dispensing system are removed from the relative dispensing position. The steps are optionally repeated until the biopolymer is formed.

BRIEF DESCRIPTION OF THE DRAWINGS

FIG. 1 is a schematic diagram depicting one embodiment of an apparatus in accordance with the present invention.

FIG. 2A is a schematic diagram depicting the bottom element of the apparatus of FIG. 1.

FIG. 2B is an enlarged portion of one wall of the bottom element of FIG. 2A.

FIG. 3A is a schematic diagram depicting another embodiment of an apparatus in accordance with the present invention.

FIG. 10 is a cross-sectional view of the apparatus of FIG. 9 taken along lines 10—10.

FIG. 11 is an enlarged view of a portion of the apparatus of FIG. 9.

FIG. 12 is a schematic diagram depicting another alternative embodiment of an apparatus in accordance with the present invention.

DETAILED DESCRIPTION OF THE INVENTION

Figure 3B:
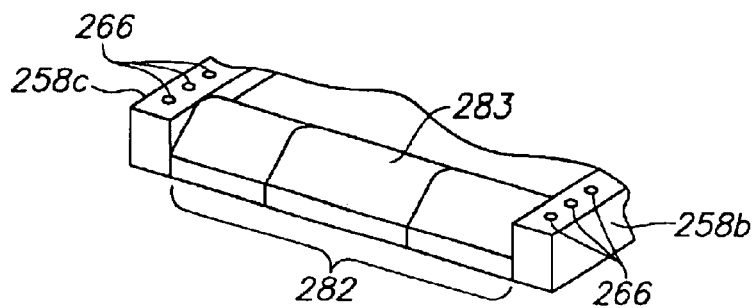
FIG. 3B is a schematic diagram depicting an end portion of the bottom element of the apparatus of FIG. 3A.

In its broadest aspect the present invention provides a reaction chamber wherein one portion of the chamber may be moved relative to another portion by means of a movable aerodynamic seal. Typically, the movable portion is smaller in size relative to the other portion. One of the portions may comprise, for example, a device for dispensing reagents and the other portion may comprise, for example, a holder for a support on the surface of which chemical compounds are synthesized. In the following discussion the terms "top element" and "bottom element" are employed in a relative sense not necessarily in an absolute sense.

Accordingly, in one embodiment of the present invention, a top element of the reaction chamber may comprise a portion of a device for dispensing reagents in sealing engagement therein. The bottom element of the reaction chamber is relatively small in size compared to the top element. It is preferred that the bottom portion of the chamber be only large enough to accommodate a support to which reagents are to be dispensed as well as certain gas flow elements. Accommodation would include fitting the support within the chamber as well as insertion and removal of the support in and from the chamber. In this way the volume of the reaction chamber may be kept as small as possible thereby making control of the environment therein easier. The entire bottom portion of the reaction chamber may be moved by appropriate motion stages while the top portion remains stationary. The top portion and the bottom portion are separated by a gap, into which gas is directed to provide for a movable aerodynamic seal.

In one approach jets of gas from the bottom portion are directed toward the top portion and impinge on the top portion, which causes the gas to move outwardly to prevent outside air from entering the reaction chamber. The width of the planar surfaces of the top and bottom portions, the size of the gap and the rate of flow of the gas are set such that an effective flow of gas into and out of the gap is obtained and an effective seal is formed in both static and moving states. The minimized volume of the reaction chamber allows for reduced flow per exchange of volume within the chamber and creates a thin flow channel within which flow may be more easily controlled. Because of the relatively small volume of the chamber, the desired level of humidity and other atmospheric conditions within the chamber are achieved more quickly than with relatively larger chambers.

A basic embodiment of the present apparatus comprises a top element, a bottom element, and a mechanism for introducing a gas to form a movable aerodynamic seal between the top element and the bottom element. The top element is usually larger than the bottom element, which is moved relative to the top element. The size of the top element is determined by a number of factors including the material of fabrication, the use of the chamber, the size of the support, which dictates the extent of X-Y stage travel needed, stage velocity, moving mass and acceleration force safely available from the stage drive system, which dictates acceleration and deceleration distances, and seal surface width. In general, the top element is sized to cover the bottom element over the full range of bottom element motion. Usually, the dimensions of the top element are about 0.2 m to about 3 m, more usually, about 0.5 to about 1 m.

The top element may be fabricated from materials such as, for example, plastics, glass, silicon dioxide, and so forth. It is within the purview of the invention that the top element and the bottom element are not fabricated from the same material. For some uses such as, for example, chambers for performing synthesis of biopolymers on supports, the material for fabrication of the top element is a transparent material such as, e.g., glass, transparent plastics, silicon dioxide and the like. It should be noted that many transparent plastic materials are hygroscopic and may allow moisture to penetrate the walls of the chamber by material diffusion. Such materials should be avoided if possible.

The bottom element of the present apparatus usually comprises a bottom wall and may or may not comprise side walls depending on the space requirements of the interior of the chamber formed by the top and bottom elements. The bottom wall of the bottom element may comprise one or more openings such as holes or slots designed to deliver a sealing gas in a gap between the top element and the bottom element when the two are brought into proximity with one another. Where side walls are also present in the bottom element, one or more openings may be present in the side walls. As in the case where no side walls are present, the openings in the side walls are usually designed to deliver a sealing gas in a gap between the top element and the bottom element when the two are brought into proximity with one another.

The bottom element is usually smaller relative to the top element. An important consideration is to keep the size of the chamber that is formed as small as possible so that volume exchange within the chamber occurs rapidly. The size of the bottom element is determined by a number of factors including the size of a support or other device placed in the chamber, the material of fabrication, the use of the chamber, and so forth. Many of the factors listed above for the size of the top element also apply to the size of the bottom element. Additional factors include the size of liquid dispensing elements such as the print heads and any features such as slopes or radiuses at the junction of the sides and bottom of the box that could interfere with the liquid dispensing elements, and so forth. Usually, the dimensions of the bottom element are about 0.05 m to about 1 m, more usually, about 0.2 m to about 0.5 m. The bottom element may be fabricated from materials such as, for example, plastics, glass, silicon dioxide, metals, lightweight composites such as, e.g., ceramic glass, carbon or polymer (e.g., KEVLAR®) fibers in an epoxy matrix, and so forth. As discussed above, it is within the purview of the invention that the top element and the bottom element are not fabricated from the same material.

The height of the walls of the bottom element, when there are walls, is dependent on a number of factors such as, for example, the desired volume of the chamber, the sizes of any devices or portions thereof that extend into, or are affixed in, the interior of the chamber or are introduced into the interior of the chamber, such as the liquid dispensing elements, the mechanism that conveys the support into the chamber, and so forth. Usually, the height of the side walls is about 1 mm to about 25 mm, more usually, about 5 mm to about 10 mm.

It is within the purview of the present invention that the bottom element of the apparatus does not include side wall(s). For example, liquid dispensing elements may be disposed in the top element so that the ends of the elements are substantially flush with a bottom surface of the top element. In this approach side walls are avoided because the dispensing elements do not extend into the chamber. Thus, a thinner chamber may be employed.

The top element and the bottom element are disposed with respect to each other such that there is a gap between the underside of the top element and the top side of the bottom element. The size of the gap is dependent on a number of factors such as, for example, the pressure of gas introduced into the gap, stage velocity, tolerances of flatness of the top and bottom elements, variability in setting co-planarity of top and bottom elements, the insertion of the support into the chamber, and so forth. The size of the gap is usually about 0.1 mm to about 3 mm, more usually, about 0.5 mm to about 1 mm.

An aerodynamic seal between the top element and the bottom element is realized by introducing a gas into the gap between the top element and the bottom element. The pressure of the gas is dependent on a number of factors including the size of the gap, the pressure of any gas introduced into the interior of the chamber formed by the top element and the bottom element, the velocity of the stages, and so forth. Usually, the pressure of the gas entering the chamber is about 0.1 to about 5 pounds per square inch (psi), usually, about 0.5 to about 2 psi. The source of the gas may be as high as about 80 to about 100 psi, usually, about 90 psi. The gas goes though a regulator that lowers the pressure of the gas to about 25 to about 40 psi, usually, about 30 psi. The gas then passes through flow meters with throttle valves. As can be understood, as the gas passes through the flow controls into the chamber, there is a pressure drop that brings the pressure of the gas entering the chamber to within the above range of about 0.1 to about 5 psi.

The gap between the top element and the bottom element is positioned such that a chamber having a movable aerodynamic seal is formed, which allows the bottom element and/or the top element to be moved relative to one another. Usually, the bottom element is moved relative to the top element, which is held stationary. The position of the gap determines the size of the chamber. Usually, the gap is positioned at or near the perimeter of the bottom element. In one embodiment, gas is introduced into the gap from an area at or near the perimeter of the bottom element from an area on the bottom element referred to as a sealing surface. In one embodiment, the flow of sealing gas is introduced at or near the middle of the sealing surface and usually flows both into and outside the chamber that is formed. If the internal pressure is low relative to atmosphere, the amount of sealing gas that flows inwardly may be, for example, about 10% to about 50% of the gas introduced through the sealing surface. Accordingly, the remaining sealing gas that is introduced flows outwardly of the chamber. In an alternative embodiment the gas is introduced into the interior of the chamber and flows outwardly through the gap to form the aerodynamic seal.

In one approach gas is introduced by means of openings in the side walls of the bottom element. The size of the openings is dependent on a number of factors such as, for example, the pressure of the gas, the number and distribution of the openings, the width of the sealing surface required, and the like. Usually, the size of the openings is about 0.1 mm to about 10 mm, more usually, about 0.5 mm to about 2 mm. The number of openings is about 2 to about 20 openings per inch, more usually, about 5 to about 10 openings per inch. In this embodiment the walls of the bottom element may be hollow to allow gas introduced therein to fill the interior of the walls and be forced out the openings into the gap. In another approach appropriate gas lines may be used in the interior of the side walls where the gas lines are connected on one end to a gas source and on the other end to the plurality of openings in the side walls. The size of the gas lines is dependent on many of the same factors as mentioned above with regard to the size of the openings.

In another approach the gas may be introduced into the gap by means of a slot, either continuous or interrupted, instead of discrete holes. In another approach the gas may be introduced by porous elements such as sintered metal or plastics. The sizes of the openings for introduction of the sealing gas for these latter embodiments are determined with reference to those set forth above.

In an embodiment that does not include side walls, the gas may be introduced by features such as discrete holes, continuous or interrupted porous elements. Automated vertical positioning could be used to establish the gap potentially increasing it for insertion of a support and decreasing it to an optimal setting during a process such as dispensing liquids from the liquid dispensing elements. Where necessary, the pressure at the liquid dispensing elements may be regulated by adjusting the sample flow rate.

As mentioned above, the gas is introduced into the gap in such as manner as to form a movable aerodynamic seal. To this end the gas flow should be directed so that the gas proceeds outwardly from the area of the top element that is impacted by the gas. In one embodiment this situation is realized by introduction of a second gas into the interior of the chamber formed by the top element and the bottom element. It is usually the practice in the art, as explained above, to introduce a gas into the interior of reaction chambers to provide for a desired atmospheric condition within the interior of the chamber such as, for example, a desired atmosphere, a desired level of humidity, and the like. The pressure of this second gas may be adjusted to provide sufficient exiting of the second gas and any sealing gas that combines with the second gas so that the combined gases flow substantially uniformly through the chamber and exit the chamber through a gas outlet. Furthermore, the second gas assists in maintaining a flow of the sealing gas outwardly from the perimeter of the bottom element. Consistent with an alternative embodiment mentioned above, the second gas is the only gas employed and is adjusted to provide an aerodynamic seal between the two elements. Accordingly, in this embodiment no gas is introduced along the perimeter of the gap In some embodiments there is a pressure differential from the middle to the edges (both inside and outside) of the seal, established by the size of the gap, the flow through it and the width and profile of the sealing surface. This differential is normally of a magnitude that is always greater than the internal chamber pressure regardless of pressure variation due to insertion of devices and so forth. In this way, some of the flow proceeds predictably into the chamber and is insensitive to pressure variations. Similarly, the magnitude of this differential protects against recirculation and entrainment of atmospheric air by having the remaining seal flow predictably exit the seal gap. This simplifies the controls needed to establish the flow regime.

As explained above, the second gas is usually under a pressure of about 1 to about 90 pounds per square inch (psi), more usually, about 20 to about 50 psi. It should be noted that this pressure is upstream of the flow controls for introducing the sealing gas into the bottom element. The pressure of the gas that exits the flow controls is about 0.1 to about 5 psi. The pressure in the chamber is usually substantially at atmospheric pressure. The pressure in the chamber should not be so high as to affect devices such as print heads, to deflect the formed chamber, or to put an excessive downward load on the stages. One consideration is that the area inside the chamber is such that a relatively low pressure can generate a significant force.

The pressure inside the chamber is not much higher than atmospheric pressure and the flow of the sealing gas is both in toward the chamber and out to atmosphere. Thus, the secondary gas flow is applied primarily to establish a predictable flow regime inside the chamber and keep sufficient flow available to avoid back flow through the exit, which remains open whether or not the door section is open. The flow inside the chamber enters as either seal flow or secondary flow and exits either out through the exit or through the sample line of a humidity sensor In a circular (or rectangular with large corner radii) approach shown in FIGS. 4–8 (discussed below), all sides are aerodynamically sealed, the flow regime is primarily radial with the inner portion of the seal flow exiting through an exit assembly, which may be centered in the top element. The gas exit (either a door or an exit nozzle) closes completely and the role of secondary flow is replaced by regulating the volume of the central discharge flow, i.e., when the door opens the central discharge flow is decreased or shut off to provide a predictable exit flow out of the door and is re-established after the door closes. The flow of sealing gas can also be regulated if necessary. This has the potential of using less gas flow than known configurations since the exit does close fully.

Another approach involves incorporating the sides and aerodynamic seal in the fixed top plate and moving the support and a support holder into position underneath this assembly effectively forming the bottom of the chamber. The holder is large enough to hold the support and keep the chamber sealed when the support is moved outside the chamber. This would eliminate the need for a door for insertion of a device into the chamber. The relative positioning of the dispensing elements with respect to the support may be done exclusively by moving the support, by moving the heads, by a combination of the two, or by arranging the dispensing elements such that the requirements of one or more axes of motion are not required. Furthermore, the holder for the support may be fixedly attached to an interior wall of the top element or the bottom element so that the holder is within the reaction chamber and the support is moved to and from the support holder by a transfer mechanism. In one approach, multiple supports, each in a separate support holder, may be moved on a belt to and from one or more top elements. When the support holder is aligned under top element, the aerodynamic seal is formed and the reactions carried out. Afterwards, the seal is discontinued and the support holders are moved by moving the belt to position another support holder under a top element. The process is then repeated.

It is important that the gas be inert to the components and conditions within the reaction chamber. The gas should be inert under the conditions of use in the present invention. Such gases include nitrogen, helium, noble gases, and the like, and mixtures thereof. Noble gases include, for example, argon, krypton, xenon, neon, and the like. For humidity control within the reaction chamber, the gas should have a water content that is less that about 0.2 ppm by volume, usually, less than about 0.1 ppm by volume, and desirably less than about 0.05 ppm by volume. The nature and composition of the gas is determined by the particular atmospheric characteristic to be controlled. In one embodiment it is convenient to use the same gas for introduction into the gas and as the second gas that is introduced into the interior of the chamber.

There may be certain circumstances where the secondary gas is a reactive gas rather than an inert gas. Such circumstances include reactions conducted within the chamber that employ a gaseous reagent as one component of the reaction synthesis. The reactive secondary gas may be introduced into the reaction chamber at the appropriate time and purged with the inert gas flow.

Appropriate valves are used to introduce the gases into the apparatus. The valves provide a level of gas flow control in the above system. Suitable valves may be, for example, metering valves such as, e.g., inline pressure compensated or non pressure compensated throttle valves or rotameters with integral throttle valves and the like. Other valves that may be employed include electrically operated directional valves or proportional valves and so forth. With the use of valves, the flow rate of each gas may be controlled. Accordingly, the flow field in the chamber can be tuned to predictably exclude atmospheric air under normal operating conditions. Also, the flow of gas into the chamber can be tuned to overcome resistance due to obstacles in the chamber. The obstacles may be, for example, robotic manipulators, print head assemblies, supports and support holding elements, and so forth. As one might appreciate, such obstacles represent interference in the flow field of the gas. With a suitable valving system, the pressure of the gas can be increased or decreased as needed. The valving systems may be controlled by suitable controllers to adjust the pressure of the gases as devices are moved into and out of the chamber. Such controllers include, for example, a self contained regulating valve that establishes a pressure or flow, for example, a manual pressure regulator that is self-contained in that it senses pressure and reacts to compensate. Another example is an electronic controller programmed to take feedback from a sensor and open and close or modulate a valve, thus, controlling the pressure. These controllers could be software running on a PC or PLC. Other controllers will be suggested to those skilled in the art in light of the disclosure herein.

The controller acts in response to an appropriate sensor that senses the integrity of the seal provided by the gas flowing into the gap, the level of gas flow within the chamber, the ambient environment within the chamber, and so forth. Suitable sensors include, for example, humidity sensors, and the like. In one approach, once the chamber gas flows are set up to provide the desired humidity level, they remain fixed. The humidity sensors are used to monitor the level and provide a high humidity alarm. In a particular embodiment, humidity is monitored by having a sensor in a tubular holder that has the sample gas flow drawn out of the chamber and over the sensor by means of a vacuum source. The sampling location is in close proximity to the fixed dispensing elements such as print heads. Multiple sample locations could also be distributed in the chamber and read serially for diagnostic use. Additionally, if there are potential areas of stagnation in certain chamber configurations, a sample may be drawn from that area and procedures implemented to mitigate the stagnation.

Under appropriate circumstances a flow visualization system may be employed to monitor the flow of gas within the apparatus and ensure that all of the gas that enters the apparatus is subsequently removed through an exit and is replaced with fresh gas. In such an approach care must be taken to avoid contamination due to the use of a flow visualization system.

An example of an embodiment of the present invention is depicted in FIG. 1. As a general note, figures are not to scale and some elements of the figures may be accentuated for purposes of illustration. Apparatus 50 comprises top element 52 and bottom element 54. Gap 56 lies between top element 52 and side walls 58a–58d of bottom element 54. Gas 60 is introduced into gap 56 from side walls 58. Bottom element 54 is fixedly attached to a movable stage 62. Bottom element 54 is depicted in FIG. 2A showing bottom wall 64 and a plurality of openings 66 in side walls 58a–58d. FIG. 2B shows an enlarged portion of wall 58b having openings 66 in top surface 59 of wall 58b. Openings 66 are in fluid communication with gas inlet 68, which is connected to a gas source line 70 and ultimately to a gas source (not shown) by means of valve 72.

Referring to FIG. 2A, bottom element 54 also comprises a second gas inlet 74, which is in fluid communication with the interior of bottom element 54 by means of opening 76 in side wall 58a. Second gas inlet 74 is also in fluid communication with a gas source (not shown) by means of gas source line 78 and valve 80. Side wall 58c comprises gas outlet 82. Movable stage 62 is connected to positioning arm 84 controlled by motor 86. In an alternative approach the gap is manually adjusted and fixed into place and the width of the side walls is commensurate with establishing a suitable pressure differential in the gas from the center of the side wall to the edge of the side wall. The top of the side wall forms the sealing surface. The fundamental principle of the seal is that a pressure differential is established from where the gas is introduced to where it exits the seal. (some exiting outside and some exiting inside the chamber). Since the gap is small and the differential of suitable magnitude, a flow velocity greater than the stage velocity and a velocity profile that will overcome any potential backflow is established.

In operation, positioning arm 84 moves bottom element 54 into position adjacent top element 52 so that gap 56 is formed. Alternatively, as mentioned above, gap 56 may be established manually by, for example, adjusting jackscrews that would vertically position top element 52 and bottom element 54. Valve 72 is actuated and gas 60 is introduced into side walls 58a–58d. Gas 60 exits through openings 66 to fill gap 56. Gas 88 is introduced into the interior of the chamber formed by top element 52 and bottom element 54 by actuating valve 80. The pressure of gas 60 and that of gas 88 is adjusted so that gas 60 fills gap 56 and flows both outwardly from gap 56 as well as into the interior of the chamber, as discussed above, while gas 88 flows through the interior of the chamber and exits through gas outlet 82. Apparatus 50 further comprises opening 83, which allows a sample of the gas within the chamber to exit apparatus 50 to a humidity sensor (not shown). Movable stage 62 is actuated and moves bottom element 54 while top element 52 remains stationary. In this way a movable aerodynamic seal is formed between top element 52 and bottom element 54. The chamber formed may be moved to various positions with respect to top element 52 and the volume of the chamber remains small compared to the overall size of top element 52.

The present apparatus and methods may be employed in the synthesis of a plurality of chemical compounds on supports. Usually, the chemical compounds are those that are synthesized in a series of steps such as, for example, the addition of building blocks, which are chemical components of the chemical compound. Examples of such building blocks are those found in the synthesis of polymers. The invention has particular application to the in situ synthesis of biopolymers such as polynucleotides, for example, oligonucleotides. Such methods usually require a step of dispensing reagents to discrete sites on the surface of a support. The present apparatus are well-suited for performing such steps, which usually require a controlled environment such as a low humidity environment.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The support or substrate to which a plurality of chemical compounds is attached is usually a porous or non-porous water insoluble material. The support can have any one of a number of shapes, such as strip, plate, disk, rod, particle such as a bead, and the like. The support can be hydrophilic or capable of being rendered hydrophilic or it may be hydrophobic. The support is usually glass such as flat glass whose surface has been chemically activated for binding thereto or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly (ethylene terephthalate), nylon, poly(vinyl butyrate), etc.; either used by themselves or in conjunction with other materials; ceramics, metals, and the like. Preferably, for packaged arrays the support is a non-porous material such as glass, plastic, metal or the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful in the synthesis of arrays of biopolymers. A biopolymer is a polymer of one or more types of repeating units relating to biology. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one-, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present devices and methods may be used in the synthesis of polypeptides. The synthesis of polypeptides involves the sequential addition of amino acids to a growing peptide chain. This approach comprises attaching a first amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Sciences* 232, 341–347. After polypeptide synthesis is complete, acid is used to remove the remaining terminal protecting groups.

The present invention has particular application to the synthesis of arrays of chemical compounds on a surface of a support. Typically, methods and apparatus of the present invention generate or use an array assembly that may include a support carrying one or more arrays disposed along a surface of the support and separated by inter-array areas. Normally, the surface of the support opposite the surface with the arrays does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 $cm^2$ or even less than 10 $cm^2$. For example, features may have widths (that is, diameter, for a round spot) in the range from a 10 $\mu$m to 1.0 cm. In other embodiments each feature may have a width in the range of 1.0 $\mu$m to 1.0 mm, usually 5.0 $\mu$m to 500 $\mu$m, and more usually 10 $\mu$m to 200 $\mu$m. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. These areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interarray areas and interfeature areas, when present, could be of various sizes and configurations.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotide arrays.

The fluid dispensing device normally includes a reagent source or manifold as well as reagent lines that connect the source to fluid dispensing nozzles and the like. Any system may be employed that dispenses fluids such as water, aqueous media, organic solvents and the like. The fluid dispensing device may comprise a pump for moving fluid and may also comprise a valve assembly and a manifold as well as a means for delivering predetermined quantities of fluid to the surface of a support. The fluids may be dispensed by any of the known techniques such as those mentioned above. Any standard pumping technique for pumping fluids may be employed in the dispensing device. For example, pumping may be by means of a peristaltic pump, a pressurized fluid bed, a positive displacement pump, e.g., a syringe pump, and the like.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate backside and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention the step of dispensing reagents to the surface of a support may be carried out using an apparatus in accordance with the present invention. The primary application of the present apparatus is dispensing monomer addition reagents to discrete sites on the surface of a support. In addition, under certain circumstances other reactions may be carried out such as, for example, phosphoramidite monomer addition, modified phosphoramidite addition, other monomer additions, addition of a polymer chain to a surface for linking to monomers, and so forth. However, other steps that may be conducted using the present apparatus include by way of illustration and not limitation, washing of the surface of the support prior to or after a reaction, protection and deprotection of certain functionalities on the surface, oxidation or reduction of functionalities on the surface such as, e.g., oxidation of a phosphite group to a phosphate group, removal of protecting groups, blocking of sites to prevent reaction at such site, capping of sites that did not react with a phosphoramidite reagent, deblocking, and so forth. It should be noted that, while the discussion herein may be directed to the synthesis of biopolymers, this is by way of illustration and not limitation. The apparatus of the invention may be used for other synthetic reactions as will be suggested to those skilled in the art in view of the disclosure herein.

The reagents that may be dispensed include, for example, a chemical reagent that forms part of the chemical compound by addition thereto, wash fluids, oxidizing agents, reducing agents, blocking or protecting agents, unblocking or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

The dimensions of the support may vary depending on the nature of the support. For example, the support may be one on which a single array of chemical compounds is synthesized. In this regard the support is usually about 1.5 to about 5 inches in length and about 0.5 to about 3 inches in width. The support may have a thickness of less than 1 cm, or even less than 5 mm, 2 mm, 1 mm, or in some embodiments even less than 0.5 mm or 0.2 mm. The thickness of the support is usually about 0.1 to about 5 mm, more usually, about 0.5 to about 2 mm. A standard size microscope slide is usually about 3 inches in length and 1 inch in width. Alternatively, multiple arrays of chemical compounds may be synthesized on the support, which is then diced, i.e., cut, into single array supports. In this alternative approach the support is usually about 5 to about 8 inches in length and about 5 to about 8 inches in width so that the support may be diced into multiple single array supports having the aforementioned dimensions. The thickness of the support is the same as that described above. In a specific embodiment by way of illustration and not limitation, a wafer that is 6⅝ inches by 6 inches is employed and diced into one inch by 3 inch slides.

Another embodiment of the present invention is an apparatus for manufacturing an array of biopolymers on a support. One such apparatus is depicted in FIGS. 3A and 3B by way of illustration and not limitation. Apparatus 200 may be employed for manufacturing an array of biopolymers on support 202. The apparatus comprises a manifold 204 comprising four compartments 206a–206d as in the embodiment of FIG. 2A. The compartments each comprise diffuser elements 208a–208d, which are tapered from inlet opening 276a to sintered metal porous element 210. Porous element 210 is in fluid communication with manifold 204 and comprises a plurality of openings or bores 212 running therethrough so that there is fluid communication between manifold 204 and the interior of chamber 211 formed when bottom element 254 is brought into position with respect to top element 252. Porous element 210 functions to provide diffusion or homogenization of momentum of the flow of gas entering apparatus 200.

Gap 256 lies between top element 252 and side walls 258a–258c of bottom element 254. Gas 260 is introduced into gap 256 from side walls 258a–258c, which have openings 266 and are in fluid communication with gas inlet 268, which is connected to a gas source line 270 and ultimately to a gas source (not shown) by means of valve 272. Bottom element 254 is fixedly attached to a moving stage 262 for moving bottom element 254 relative to top element 252. In this way support 202 inserted into chamber 211 is moved into various positions relative to dispensing nozzles 218 so that reagents may be dispensed to different discrete sites on support 202. Bottom element 254 also comprises a second gas inlet 274, which is in fluid communication with chamber 211 by means of opening 276 in side wall 258a. Second gas inlet 274 is also in fluid communication with a gas source (not shown) by means of gas source line 278 and valve 280. Moving stage 262 comprises an x,y stage 262a and a theta stage 262b, which are controlled by motor 286, which may be a single motor or multiple motors.

Device 214 for dispensing reagents for synthesizing an array of biopolymer features on support 202 is mounted in top element 252 of apparatus 200 so that dispensing nozzles 218 protrude into the interior of chamber 211. The remainder of dispensing device 214, which includes reagent source lines 222 and reagent source manifold 224, are mounted outside of chamber 211. Device 214 is mounted in top element 252 in a sealed manner so that gas does not escape from chamber 211 through the area around the opening in top element 252 in which dispensing nozzles 218 are mounted. Bottom element 254 of apparatus 200 has movable section 283 of exit nozzle 282 through which robot arm 230, controlled by controller 233, may insert support 202 into the interior of chamber 211. Movable section 283 in one embodiment acts as a door through which the support may be inserted into chamber 211 in a manner such that a sufficient seal exists to prevent gas from exiting through opening created by moving section 283. Support 202 is secured to holding element 232, which may be in the form of a vacuum chuck that is either affixed in the interior of chamber 211 or is inserted therein as part of robot arm 230.

Gas 288 is introduced into apparatus 200 through gas inlets 276a–276d each of which is in fluid communication with a respective compartment 206a–206d of manifold 204 and with a respective gas valve 280a–280d. Gas 288 is diffused in the compartments and undergoes homogenization and diffusion as it passes through porous element 210 into chamber 211. The direction of flow of the gas is substantially perpendicular to exit nozzle 282 of apparatus 200. Gas 288 combines with that portion of gas 260 that proceeds inwardly from openings 266 in side walls 258a–258c and the combined gases exit chamber 211 through gap 256 above exit nozzle 282, which in the embodiment shown extends between side wall 258b and side wall 258c. (Note that in FIG. 3A, side wall 258b is not shown so that the interior elements of apparatus 200 may be viewed.) A sample of gas 288 combined with gas 260 may also exit through port 289. The combined gases may be sampled by a humidity sensor (not shown) to assess the dryness level of gas 288 and gas 260 and to allow adjustments to be made to achieve the predetermined desired level of dryness of gas 288 and gas 260. The functioning of the valves, robot arms, dispensing device, and so forth may be controlled by suitable controllers to carry out a predetermined sequence of events. The controllers may be under computer control to further automate the process and instructions may be introduced into the computer by means of suitable software programs. The controllers are also instructed as to the sequence of nucleotides that is to be employed to prepare the desired oligonucleotides on the surface of support 202. A unique sequence may be specified at each site on the support.

As mentioned above, a porous element is in fluid communication with the manifold. The porous element comprises a plurality of openings therein. The pressure differential behind the porous element forces a series of small jets out of the plurality of openings. The porous element usually comprises about 5 to about 200 opening per square inch, usually, about 10 to about 50 openings per square inch. The openings may be considered to be perforations in the porous element (for relatively thin porous elements) or bores through the porous element (for relatively thick porous elements). The thickness of the porous element is primarily dependent on whether the porous element is used alone or in conjunction with a flow straightener. The porous element is relatively thick, namely, about 0.25 to about 2 inches thick, usually, about 1 to about 1.5 inches thick, more usually, about 0.8 to about 1.2 inches thick. When the porous element is employed in conjunction with a flow-straightening element, the porous element may be relatively thin, namely, about 0.02 to about 0.2 inches thick, usually, about 0.05 to about 0.07 inches thick. In general, the dimensions of the openings are dependent on the balance between the diffusion quality needed and the change in pressure available. The dimensions of the openings are about 0.03 to about 0.25 inches in diameter, usually about 0.05 to about 0.125 inches in diameter.

It should be noted as mentioned above that the array of holes may be replaced by a slot in each compartment where space permits. Furthermore, in certain embodiments secondary flow holes need to be spaced to avoid the seal flow holes that run orthogonal to them.

The porous element is fabricated from a material that does not absorb water to any significant extent. By this is meant that the material does not absorb enough water that can later be liberated from the surface and interfere with the reactions that are to be carried out in a reaction chamber comprising the present apparatus. The absorbance tolerance for the material depends, therefore, on the nature of the reaction, production time requirements that may be impacted by an extended drydown, flowrate through the element, which would dilute the released humidity, and so forth. Accordingly, the material should not appreciably absorb water or outgas any potential contaminants such as plasticizers or chemicals in adhesives. Suitable materials for the porous element include, by way of example and not limitation, stainless steel, e.g., electropolished stainless steel, a material coated with a hydrophobic surface, nickel plated aluminum, and so forth. The porous element may be fabricated by techniques such as, for example, creating the features with conventional or electrical discharge machining, forming, punching, assembling or agglomerating small pieces by sintering, welding or brazing, using CNC machine tools, and the like, which are well known in the art.

As mentioned above, in one embodiment a flow-straightening element may be employed in fluid communication with the porous element. The flow-straightening element provides for straightening of the direction of the flow and ameliorates any large-scale aspects surviving in the flow. The flow-straightening element comprises a plurality of cavities within the structure of the element. The percentage of open area within the flow-straightening element due to the presence of cavities is about 65 to about 95%, usually, about 90 to about 95%. In one approach the flow-straightening element is a honeycomb element comprising a plurality of honeycomb features. Typically, the number of such cavities or features is sufficient to achieve the percentage of open area indicated above. Usually, the ratio of the length of the honeycomb element to the honeycomb features is at least about 7 to 1, at least about 8 to 1, at least about 10 to 1. The flow-straightening element is generally fabricated from a material that does not absorb water to any significant extent. Such materials are set forth above.

The flow-straightening element and the porous element are usually separated by a space. The thickness of the space is dependent on a number of factors such as, for example, the hole size in the diffuser element, the size of the flow straightener cell, flowrate and so forth. Usually, the space is about 1 to about 50 mm thick, more usually, about 2 to about 10 mm thick. The flow-straightening element and the porous element may be mounted in the interior of the chamber in a number of ways to achieve the appropriate space therebetween. Suitable mounting means include brackets, indentations in the wall of the chamber, clamping between chamber components, and so forth.

As mentioned above, the chamber comprises a gas outlet through which the second gas and any gas, which forms the aerodynamic seal and flows inwardly into the chamber, exit the chamber. Usually, the gas outlet is in a wall of the chamber opposite the wall in which the second gas is introduced. In one embodiment the gas outlet is a door in a wall of the chamber. The door is provided with a suitable pivoting mechanism to allow the door to be moved for ingress or egress of a device. In another embodiment the gas outlet comprises a nozzle that provides for exiting of the second gas without entrainment of atmospheric air. The nozzle may extend along a portion or the entire wall of the chamber opposite the wall in which the second gas is introduced.

In the above embodiment and in other embodiments, the walls of the chamber leading to the wall comprising the gas outlet may be gradually tapered. If the taper is too steep, the flow of gas may develop centrifugal instabilities along the wall of the chamber and, ultimately, to a decrease in homogenization of flow of gas through the chamber. The walls may be tapered about 0 to about 10 degrees, usually, about 5 to about 7 degrees. It should be noted that, in the interest of decreasing the volume of the chamber as much as possible, the internal dimensions are kept as small as possible. This should be done while maintaining appropriate space within the chamber for devices inserted therein or present therein. Tapering, therefore, is often limited to the exit area that could be a curved surface composed of a variety of local angles, which could approach 90 degrees.

The chamber cross-section is typically rectangular although other shapes may be employed depending on the nature of the operation to be performed in the interior of the chamber. For preparing supports having a plurality of biopolymer features thereon, the chamber cross-section is usually rectangular. In general, for synthesis of biopolymers on the surface of a support, the dimensions of the chamber should be sufficiently large enough so that the chamber can accommodate the support.

Typically, an apparatus for synthesis of biopolymer features has vertical symmetry to avoid any three-dimensional and/or re-circulating flow and to maintain a substantially steady and uniform flow, i.e., a controlled flow. Maintaining a controlled flow of gas within the chamber ensures that the boundary layer, i.e., the region of vortical flow near the surface where viscous effects are important, along the chamber walls remains attached to the surface as long as possible. By the term "substantially uniform flow" or "substantially controlled flow" is meant that the flow is controlled or uniform to the extent that little or no backflow occurs. In other words, the flow is controlled to the extent necessary to avoid entrainment of air outside the chamber. In one embodiment, the flow is substantially unidirectional, which means that recirculating flow is minimized to the extent that the atmosphere in the area of the support is protected from atmospheric air/humidity and remains at a humidity level that is conducive to the completion of the chemical reactions needed in the synthesis process. Many of the chemical reactions take place very quickly, usually, in seconds or fractions of a second and are complete when the part is removed from the chamber and moves through ambient atmosphere to devices for performing other steps of a particular synthesis. The flow rate of the gas through the reaction chamber is about 1 to about 200 liters per minute, usually, about 30 to about 70 liters per minute.

It should be noted that laminar, turbulent or fully developed flow (referring to the boundary layer conditions) may be used to establish an overall flow regime in the chamber. One consideration is that the flow may not be totally predictable in detail due to factors such as the interaction of the seal flow entering the chamber and interference from devices inside the chamber. Furthermore, the streamlines of the clean flow issuing from the flow straightener or diffuser may not be very straight at the exit. The flow could be moving at a velocity, even recirculating with small enough amplitude, low enough frequency and/or energy, with respect to the size of and conditions at the exit so as not to entrain atmospheric air. In the present invention the chamber works because the aerodynamic seal excludes atmospheric air and the overall flow regime works to usher flow predictably (at the "macro" level) out the exit, i.e., with minimal or no backflow or recirculation of atmospheric air into the chamber.

The walls of the chamber may be fabricated from materials such as, for example, plastics, glass, silicon dioxide, metals, lightweight composites, and so forth. It is within the purview of the invention that the walls are not fabricated from the same material. For some uses such as, for example, chambers for performing synthesis of biopolymers on supports, the material for fabrication of at least one wall is transparent such as, e.g., glass, transparent plastics, silicon dioxide, and the like. Many transparent plastic materials are hygroscopic and may allow moisture to penetrate the walls of the chamber by material diffusion. Such materials should be avoided if possible.

The edges and joints of the chamber walls are areas that are susceptible to entraining moisture from the high-humidity environment outside the chamber. The right angle formed by these joints may produce resident vortices near the joints. The joint must have an airtight seal. If the joint is not sealed adequately, any small gap between the abutted elements may fill with near stagnant gas. Moisture may diffuse into the stagnant gas in this gap because the velocities of the gas in the gap are very small and the humidity concentration gradients are very high across this region. To reduce the possibility of the above, angles in the interior of the chamber may be beveled. The angles of particular concern are those at the edges and joints of the interior of the chamber. In general, the angles are beveled to the extent necessary to substantially reduce or eliminate stagnation of gas at or near these joints. Ideally, the angles are beveled at about 45 degrees or radiused although other angles may be employed.

The perimeter walls of the apparatus are usually constructed from a suitable material that gives structural strength to the apparatus so that various moving parts may be employed in conjunction with the apparatus. In addition, the structural strength must be sufficient to accommodate the gas pressures employed. Such materials include, for example, metal, plastic, glass, lightweight composites, and the like.

In one embodiment of a method for synthesizing a plurality of biopolymers on a support in accordance with the present invention, the support is introduced into a reaction chamber formed from top and bottom elements where there is a movable aerodynamic seal between the top and bottom elements. The reaction chamber has a positive and substantially uniform flow of gas through the reaction chamber. The gas combines with a portion of the sealing gas, which is introduced into a gap between the top and bottom elements and traveling inwardly within the chamber, and exits the reaction chamber through a gas outlet in a direction that is generally the same as the uniform flow of gas. Discrete sites on the surface of the support are activated for attachment of a biopolymer precursor. The bottom element is moved by moving stages to bring the support into a predetermined position with respect to a dispensing system for dispensing reagents for the synthesis of the biopolymers. Reagents are dispensed to the discrete sites. The support is removed from the relative dispensing position. Optionally, the above steps are repeated until the biopolymer is formed. The method has particular application to the in situ synthesis of an array of biopolymers on the surface of a support.

The aforementioned apparatus may be employed in the automated manufacture of an array of oligonucleotides on the surface of support 202 consistent with the above-described method. Phosphoramidite synthetic methods may be employed in conjunction with the aforementioned apparatus 200 to provide a controlled environment within the interior of chamber 211. The surface of support 202 may be activated to provide for a first monomer in the synthesis chain already present on the surface of support 202. Bottom element 254 is brought into proximity of top element 252 by means of moving stage 262 controlled by controller 286. On the other hand, bottom element 254 may be brought into proximity of top element 252 manually and then locked into place. A controller opens valves 272 so that gas 260 enters side walls 258a–258c and exits through openings 266 in the top portion of side walls 258a–258c. Gas 260 fills gap 256. A controller also opens valves 280a–280d so that gas 288 enters manifold 204 and flows though diffusers 208a–208d (diffuser 208a is shown and top and bottom portions are labeled 208a) and porous elements 210a–210d into chamber 211 and combines with that portion of gas 260, which travels inwardly into chamber 211, and also create a controlled environment within the interior of chamber 211. Valving may also be achieved manually. A controller 233 directs the movement of robotic arm 230 so that support 202 is moved into the interior of chamber 211. A controller directs the movement of x,y-stage 262a and theta stage 262b so that bottom element 254 is moved with respect to top element 252 and, in particular, with respect to dispensing nozzles 218 so that the activated surface of support 202 is in proper orientation with respect to dispensing nozzles 218. Movement of bottom element 254 is controlled for precise placement of spots of reagents at particular sites on support 202. Support 202 is inserted into chamber 211 through exit nozzle 282 and gap 256 and placed on support holding element 232. Referring to FIG. 3B, the opening for entry of support 202 in this embodiment is created by moving section 283 of the exit nozzle 282 so that the support may be inserted into chamber 211. Accordingly, the size of section 283 is sufficient to allow the support to pass through. Section 283 may be moved by using appropriate moving mechanisms such as linear or rotary actuators, for example, air cylinders, electric motors, solenoids and the like.

The reagents are delivered to the individual sites using the dispensing device 214 where the dispensing nozzles 218 are at a fixed location and the support is moved by virtue of the movement of bottom element 254 with the above stages. Since the surface of support 202 is activated with a first monomer in the synthesis and the first monomer usually comprises a protection group, the protection group must be removed prior to the addition of a second monomer. This exposes an activated moiety on the monomer, which reacts with the next phosphoramidite reagent that is delivered to the surface of support 202 by means of dispensing nozzles 218. The next dispensed phosphoramidite reagent reacts only at specific discrete sites on the surface of support 202.

During the synthesis, there are a number of instances where the surface of the support must be washed to remove unreacted or unwanted materials. Furthermore, deprotection agents are added to remove protection groups and oxidizing agents are added to oxidize certain groups such as phosphite groups to phosphate groups. These steps may be carried out using dispensing device 214 to dispense wash buffers or deprotection agents, as the case may be, to the surface of support 202. On the other hand, robot arm 230 is activated to remove support 202 from chamber 211 and move support 202 to a station for washing its surface or to a station for administering deprotection or other agents. Robot arm 230 then moves support 202 back through opening 228 into the interior of chamber 211. A controller again directs the movement of x,y-stage 262a and theta stage 262b and, thus, bottom element 254, with respect to dispensing nozzles 218 for precise placement of spots of reagents at particular sites on support 202. The aforementioned steps are continued under the control of the various controllers until the desired oligonucleotides are synthesized in an array on support 202.

During the various steps in the synthesis of the oligonucleotides, the temperature of the reactions requires control to facilitate the reactions. Usually, the reactions require ambient temperatures although elevated temperatures may be required in order for some reactions to occur. In one approach the temperature of the interior of the chamber may be controlled by controlling the temperature of gas 288 that is introduced into apparatus 200. In another approach, holding element 232 may be equipped with heating elements to provide for temperature control. In yet another approach, the temperature of the reagents that are dispensed through device 214 may be controlled as the reagents are dispensed to the surface of support 202.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

Figure 4:
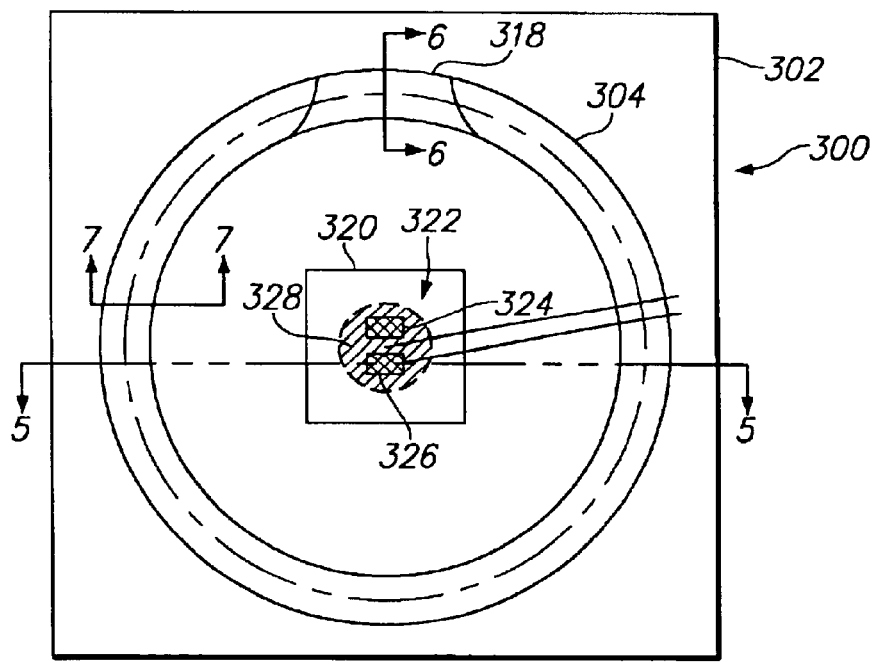
FIG. 4 is a schematic diagram depicting an alternative embodiment of an apparatus in accordance with the present invention.
Figure 5:
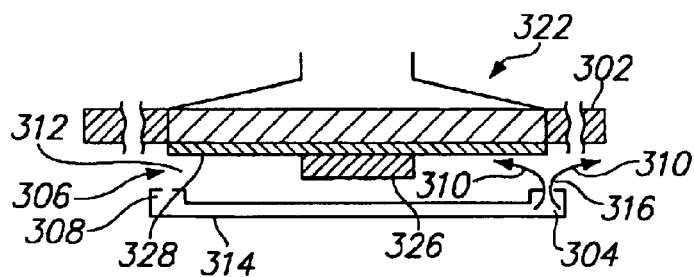
FIG. 5 is a cross-sectional view of the apparatus of FIG. 4 taken along lines 5—5.
Figure 6:
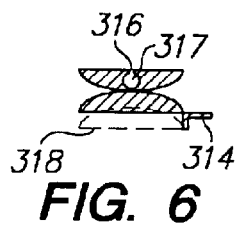
FIG. 6 is a cross-sectional view of the door section of the bottom element of the apparatus of FIG. 4 taken along lines 6—6.
Figure 8:
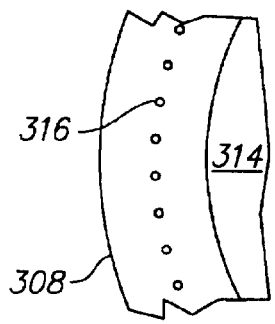
FIG. 8 is an enlarged view of a portion of the bottom element of the apparatus of FIG. 4.
Figure 7:
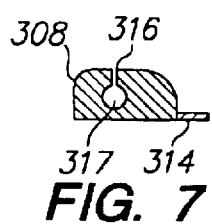
FIG. 7 is a cross-sectional view of a portion of the bottom element of the apparatus of FIG. 4 taken along lines 7—7.

Another embodiment of an apparatus in accordance with the present invention is depicted in FIGS. 4–8. Apparatus 300 comprises rectangular top element 302 and circular bottom element 304. Gap 306 lies between top element 302 and side wall 308 of bottom element 304. Gas 310 is introduced into gap 306 from side wall 308; gas 310 flows outwardly from apparatus 300 and inwardly to chamber 312. Bottom element 304 is fixedly attached to a movable stage (not shown). Bottom element 304 is depicted in FIG. 4 showing bottom wall 314 and a plurality of openings 316 in side wall 308. Openings 316 are connected to channel 317 that is formed in side wall 308 and in fluid communication with a gas inlet (not shown). Referring to FIGS. 4 and 6, bottom element 304 comprises door section 318 for insertion and removal of a support 320 into and out of apparatus 300.

Top element 302 comprises exit assembly 322, which comprises print heads 324 and 326 as well as porous diffuser 328, which encircles the print heads. Porous diffuser 328 provides for exit of gas 310 from chamber 312 when door section 318 is closed. The nature and composition of porous diffuser 328 is determined by its primary function of keeping the flow velocity of gas 310 distributed over exit element 322. Porous diffuser 328 may be made from, for example, sintered metal or other compatible material or from a material having a suitable plurality of holes. Print heads 324 and 326 and porous diffuser 328 are fixedly mounted in top element 302. In the embodiment shown in FIGS. 4–8, print heads 324 and 326 extend from the plane of top element 302. Accordingly, the size of chamber 312 must be chosen to accommodate print heads 324 and 326 when chamber 312 is formed. Exit of gas 310 through exit assembly 322 may be assisted by a vacuum. Gas 310 may be sampled by a humidity sensor (not shown) to assess the dryness level of gas 310 and to allow adjustments to be made to achieve the predetermined desired level of dryness of gas 310. When door section 318 opens for insertion or removal of support 320, the exit of gas 310 through exit assembly 322 is halted to allow gas 310 to exit through door section 318.

Figure 9:
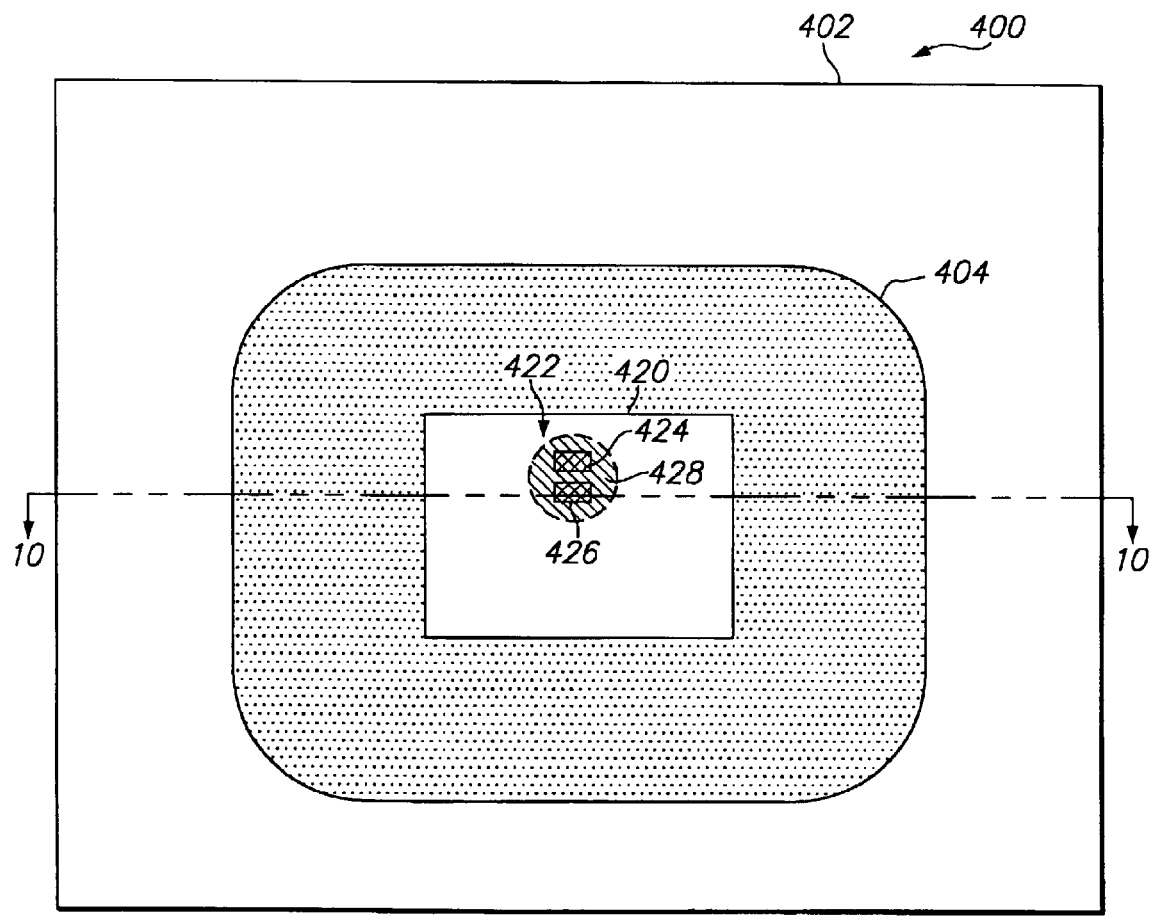
FIG. 9 is a schematic diagram depicting another alternative embodiment of an apparatus in accordance with the present invention.

Another embodiment of an apparatus in accordance with the present invention is depicted in FIGS. 9–11. Apparatus 400 comprises rectangular top element 402 and bottom element 404, which is rectangular with radiused corners. Gap 406 lies between top element 402 and bottom element 404. Gas 410 is introduced by means of gas inlets 413 into gap 406 from porous floor 408 of bottom element 404; gas 410 flows outwardly from apparatus 400 and inwardly to chamber 412. Bottom element 404 is fixedly attached to a movable stage (not shown). Referring to FIGS. 9–11, bottom element 404 comprises a door section (not shown) for insertion and removal of a support 420 into and out of apparatus 400.

Top element 402 comprises exit assembly 422, which comprises print heads 424 and 426 as well as porous diffuser 428, which encircles the print heads. Porous diffuser 428 provides for exit of gas 410 from chamber 412 when the door section is closed. The nature and composition of porous diffuser 428 is as discussed above for porous diffuser 328 of FIGS. 4–8. Print heads 424 and 426 and porous diffuser 428 are fixedly mounted in top element 402. In the embodiment shown in FIGS. 9–11, print heads 424 and 426 are even with the bottom surface of top element 402. In other words print heads 424 and 426 do no extend beyond the bottom surface of top element 402. Accordingly, the vertical size of chamber 412 is minimized and has less dependence on accommodating print heads 424 and 426 when chamber 412 is formed since no sidewalls exist to potentially mechanically interfere with the print heads. Exit of gas 410 through exit assembly 422 may be assisted by a vacuum. Gas 410 may be sampled by a humidity sensor (not shown) to assess the dryness level of gas 410 and to allow adjustments to be made to achieve the predetermined desired level of dryness of gas 410. When the door section opens for insertion or removal of support 420, the exit of gas 410 through exit assembly 422 is halted to allow gas 410 to exit through the door section.

As mentioned above, another embodiment of the invention involves incorporating the sides and aerodynamic seal in a fixed top plate and moving the support and a support holder into position underneath this assembly effectively forming the bottom of the chamber. The holder is large enough to hold the support and keep the chamber sealed when the support is moved outside the chamber. This embodiment is depicted in FIG. 12. Apparatus 450 comprises rectangular top element 452 and bottom element 454, which is rectangular. Gap 456 lies between top element 452 and bottom element 454. Gas 460 is introduced into gap 456 by means of gas outlets 458 in top element 452. Gas 460 flows outwardly from apparatus 450 and inwardly to chamber 462. Bottom element 454 may be moved into position under top element 452 by means of a conveyor (not shown).

Top element 452 comprises exit assembly 462, which comprises print heads 464 and 466 as well as porous diffuser 468, which encircles the print heads. Porous diffuser 468 provides for exit of gas 460 from chamber 462. The nature and composition of porous diffuser 468 is as discussed above for porous diffuser 328 of FIGS. 4–8. Print heads 464 and 466 and porous diffuser 468 are fixedly mounted in top element 452. In the embodiment shown in FIG. 12, print head 464 and print head 466 are even with the bottom surface of top element 452. In other words print heads 464 and 466 do no extend beyond the bottom surface of top element 452. Note that print head 464 lies behind print head 466 in the depiction in FIG. 12. As with the embodiment of FIGS. 9–11, exit of gas 460 through exit assembly 462 may be assisted by a vacuum. Gas 460 may be sampled by a humidity sensor (not shown) to assess the dryness level of gas 460 and to allow adjustments to be made to achieve the predetermined desired level of dryness of gas 460. Bottom element 454 comprises support 470, which is secured in bottom element 454.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

As mentioned above, the apparatus functions and the methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FORTRAN and C++. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) moving a bottom element into position relative to a top element to provide a gap therebetween, (ii) introducing a gas into the gap to create a movable aerodynamic seal between the top and bottom elements and to form a sealed chamber, (iii) introducing a pressured second gas into the interior of the chamber formed above, (iv) placing the support into the above chamber, (v) securing the support to a support holding element, (vi) moving the bottom element relative to the top element thereby moving the support relative to dispensing nozzles of a reagent dispensing device in the top element, (v) dispensing monomeric reagents to predetermined sites on the surface of the support, (vi) moving the support for applying reagents other than the monomeric reagents to the surface of the support, (vii) optionally, repeating the above steps until the array of biopolymers is formed, and (viii) removing the support from the chamber of the apparatus. Optionally, the second gas may be introduced into a manifold within the chamber. The manifold comprises a plurality of compartments. The gas is introduced in a manner such that the gas velocity is diffused and the gas traverses the interior of the chamber, in a grossly predictable manner, to a gas outlet at an end of the chamber opposite the manifold without recirculation of a degree that would cause the entrainment of atmospheric air into the box. Another aspect of the present invention is a computer program product comprising a computer readable storage medium having a computer program stored thereon which, when loaded into a computer, performs the aforementioned method.

The above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A method for synthesizing an array of biopolymers on a support, said method comprising:

(a) performing a step in the synthesis of an array of biopolymers on a support in a reaction chamber formed between two elements disposed relative to one another in a sealed, movable relationship, wherein said support and one of said elements is moved relative to the other of said elements during said performing, (b) removing said support from said reaction chamber, and (c) optionally repeating steps (a) through (b) until said array of biopolymers is formed.

2. A method according to claim 1 wherein said reaction chamber is formed by disposing two elements relative to one another to form a gap therebetween; and introducing a gas into said gap to form a sealed reaction chamber comprising said two elements.

3. A method for synthesizing an array of biopolymers on a support, said method comprising:

(a) introducing a support into a reaction chamber formed between a separate top element and a separate bottom element disposed relative to one another to form a gap therebetween, said a top element having sealingly affixed therein at least a portion of a device for dispensing reagents, said bottom element being adapted for introduction of a support therethrough, wherein a gas is introduced into said gap, a pressure of said gas being sufficient to form an aerodynamic seal between said top element and said bottom element thereby forming said chamber, and wherein said top element or said bottom element is movable with respect to the other during said aerodynamic seal (b) bringing said support and a dispensing system for dispensing reagents for the synthesis of said biopolymers into a dispensing position relative to discrete sites on said surface of said support by moving said support and said bottom element relative to said top element, (c) activating said support if said support is not already activated and dispensing said reagents to said discrete sites to perform a step of said synthesis, (d) removing said support and/or said dispensing system from said relative dispensing position, and (e) optionally repeating steps (a) through (d) until said array of biopolymers is formed.

4. A method according to claim 3 wherein said gas is introduced adjacent a perimeter of said top element and a perimeter of said bottom element.

5. A method according to claim 3 wherein said gas is introduced through openings in side walls of said bottom element.

6. A method according to claim 3 wherein said gas is introduced at a pressure of about 20 to about 50 psi.

7. A method according to claim 3 comprising introducing a second gas into an interior of said chamber after step (b).

8. A method according to claim 7 wherein a flow of said second gas through the interior of said chamber is substantially uniform.

9. A method according to claim 7 wherein a flow of said second gas within the interior of said chamber is dispersed.

10. A method according to claim 7 wherein said second gas is selected from the group consisting of nitrogen, argon, neon and helium.

11. A method according to claim 3 wherein said reagents are monomer addition reagents.

12. A method according to claim 3 wherein an array of said biopolymers is synthesized on said support.

13. A method according to claim 3 wherein said biopolymers are polynucleotides or polypeptides.

14. A method according to claim 3 wherein said biopolymers are synthesized on said surface in multiple arrays and said support is subsequently diced into individual arrays of biopolymers on a support.

15. A method according to claim 3 for synthesizing an array of biopolymers on a surface of a support, said method comprising adding one or more polymer subunits at each of multiple feature locations on said support during each of multiple rounds of subunit additions wherein each round of subunit additions comprises:

(a) introducing said support into said reaction chamber, (b) bringing said support and a dispensing system for dispensing said polymer subunits for the synthesis of said biopolymers into a dispensing position relative to said discrete sites on said surface, (c) dispensing said polymer subunits to said discrete sites, and (d) removing said support and/or said dispensing system from said dispensing position.

16. A method according to claim 3 wherein said biopolymers are synthesized on said surface in multiple arrays and said support is subsequently diced into individual arrays of biopolymers on a support.

17. A method according to claim 3 further comprising exposing the array to a sample and reading the array.

18. A method according to claim 17 comprising forwarding data representing a result obtained from a reading of the array.

19. A method according to claim 18 wherein the data is transmitted to a remote location.

20. A method according to claim 17 comprising receiving data representing a result of an interrogation obtained by the reading of the array.

21. A method according to claim 3 wherein said top element is stationary and said bottom element is moved relative to said top element to bring said support and said dispensing system for dispensing reagents for the synthesis of said biopolymers into a dispensing position relative to discrete sites on said surface of said support.

* * * * *